United States Patent [19]
Majewski

[11] 3,845,574
[45] Nov. 5, 1974

[54] EDUCATIONAL GAME TYPE TOY

[76] Inventor: Eugene J. Majewski, 121 N. Elmore Ave., Park Ridge, Ill. 60068

[22] Filed: July 26, 1973

[21] Appl. No.: 382,775

[52] U.S. Cl............................ 35/72, 35/22 A, 35/70, 35/71
[51] Int. Cl. ............................................. G09b 1/36
[58] Field of Search ...... 35/31 R, 31 D, 31 F, 31 G, 35/35 R, 35 H, 35 J, 22 R, 22 A, 69–73; 273/137 B, 137 C; 46/25; 220/23.6; 99/426; 249/DIG. 1; D9/184, 185, 187, 189, 192

[56] References Cited
UNITED STATES PATENTS

| | | | |
|---|---|---|---|
| 284,525 | 9/1883 | Williams | 273/137 C |
| 1,584,062 | 5/1926 | Williamson | 273/137 C |
| 2,241,707 | 5/1941 | Langel | 220/23.6 |
| 2,861,388 | 11/1958 | Favaretto | 46/25 X |
| 3,053,537 | 9/1962 | Moss | 273/137 C |
| 3,673,987 | 7/1970 | Fletcher | 220/23.6 X |
| D85,969 | 1/1932 | Siciliani | D9/187 |
| D163,085 | 5/1951 | Bishop | 35/72 X |

FOREIGN PATENTS OR APPLICATIONS

| | | | |
|---|---|---|---|
| 656,040 | 8/1951 | Great Britain | 35/72 |

OTHER PUBLICATIONS

"Jumbinoes" Advertisement, Dated 3-10-66.
"Alphabet Block Train" Article; Popular Science Magazine; Vol. 149, p. 151, Nov. 1946.

*Primary Examiner*—Wm. H. Grieb

[57] ABSTRACT

An educational game type toy comprising a plurality of oblong members having opposed end sections each with hollow configurations adapted to nest and interlock with end sections of other members having identical configurations.

8 Claims, 10 Drawing Figures

EDUCATIONAL GAME TYPE TOY

This invention relates to game type toys which are designed to assist in teaching small or handicapped children to recognize configurations and distinguish between similar and dissimilar configurations.

The invention also is helpful in teaching chldren to learn sequential patterns or arrangements such as numbers or letters of the alphabet.

It is a primary object of the invention to provide, in an arrangement of the type described, a plurality of members or playing pieces which will mate in an interlocking arrangement only when the pieces are arranged in the proper alignment or sequence.

A more specific object of the invention is the provision, in an arrangement of the type described, of a plurality of members or playing pieces each having a pair of end sections with hollow raised portions having configurations adapted to nest only with identical configurations of other pieces.

These and other objects of the invention will be apparent from an examination of the following description and drawings, wherein.

It will be understood that, for purposes of clarity, certain elements may have been omitted from certain views where they are believed to be illustrated to better advantage in other views.

Figure 4:
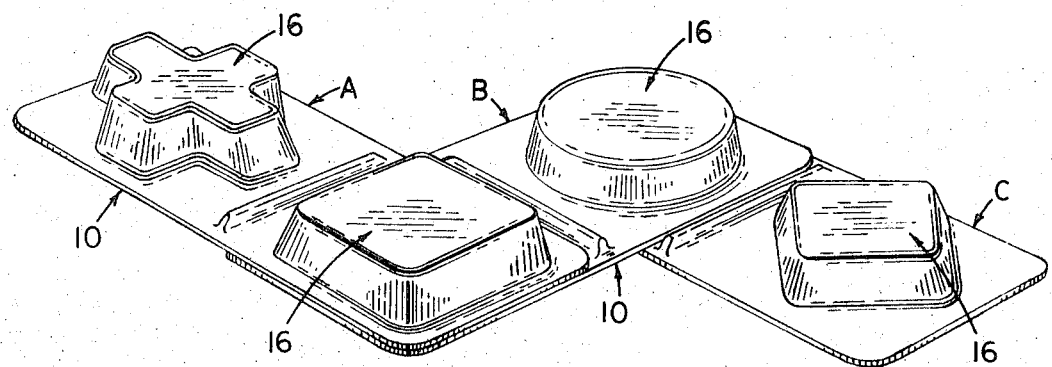
FIG. 4 is a perspective view illustrating the manner in which the structure of FIG. 1 is employed in relation to related members.
Figure 5:
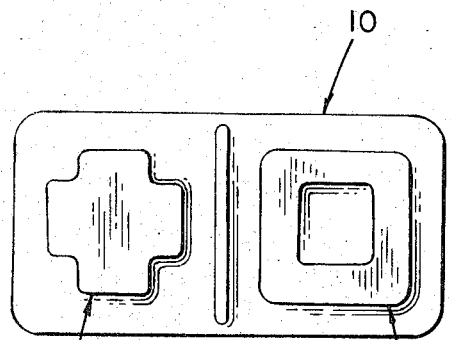
FIGS. 5 through 10 are views similar to FIG. 2, but illustrate modified forms of the invention where different types of configurations are employed.
Figure 8:
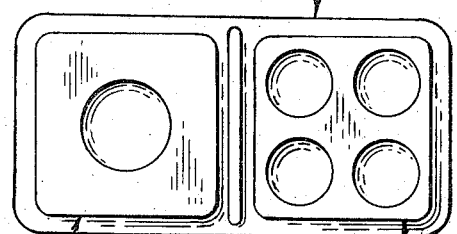
Figure 6:
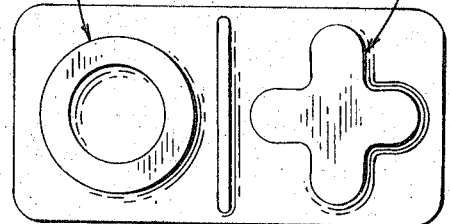

Turning now to the drawings for a better understanding of the invention, and particularly to FIG. 4, it will be seen that the novel game type toy embodying the invention includes a plurality of similar, but not identical, members or playing pieces designated A, B and C, respectively. It is to be understood of course that the entire set may include any desired number of pieces.

The individual members or pieces of the set are designed so that matching end portions of different pieces are adapted to nest with each other to provide an interlocking fit in a domino type arrangement or game.

The individual pieces may be formed in various ways from different materials, but a preferred construction is to thermo form them from a relatively lightweight plastic material.

Figure 2:
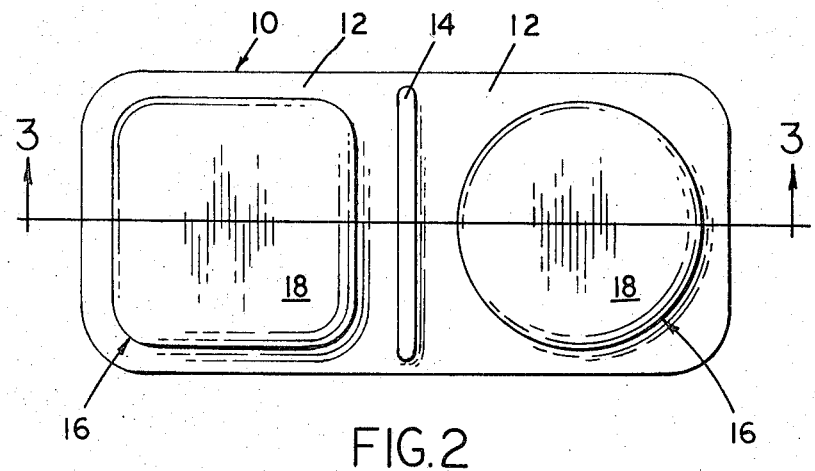
FIG. 2 is a top plan view of the structure illustrated in FIG. 1.
Figure 3:
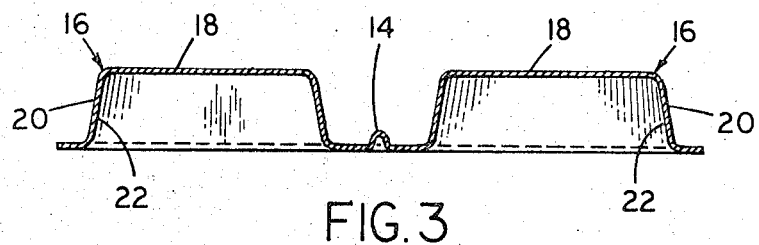
FIG. 3 is a vertical section taken on line 3—3 of FIG. 2.
Figure 1:
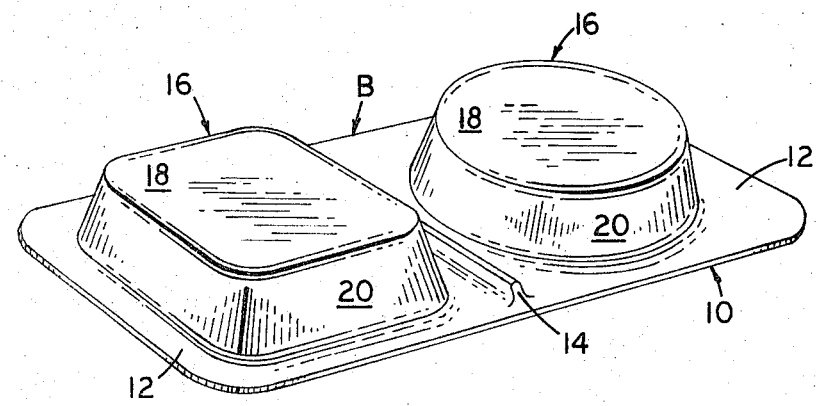
FIG. 1 is a perspective view of an article embodying features of the invention.

It will be seen that each individual piece or member of the set, such as member B illustrated in FIG. 1, includes a relatively thin, flat, oblong base plate 10 having at integral, opposed end sections 12 separated from each other by a transversely extending reinforcing rib 14.

Each end section 12 includes a hollow, raised portion or contoured element 16 which includes a preferably flat top wall 18 and one or more side walls 20. Each contoured element 16 is hollow, so that it presents on its under side a depression or cavity 22 adapted to receive and nest with a similar contoured element of another member which has a contoured element of identical configuration as hereinafter described in the specification.

Although certain of the members may have end sections with contoured elements or raised portions of identical configurations, preferably most, if not all, of the members or pieces of the set are provided with end sections having contoured elements with different configurations in the manner of the markings on a set of dominos.

For example in FIG. 4, it will be seen that member A is provided with configurations of a cross at one end and a square at the other end; member B has a square at one end and a circle at the other end; and member C has a circle at one end and a diamond at the other end. The designs shown are merely for purposes of illustration and any number of configurations may be employed as illustrated in FIGS. 5 through 10.

It will be noted that the configurations illustrated in FIGS. 5 through 8 are all symmetrical, so that end sections with identical configurations can be nested when the members are joined at right angles with each other as well as when they are joined in a straight line. This arrangement permits the set of members to be employed in a game much like dominos, wherein matching ends of pieces can be nested and interlocked only if they have raised portions or contoured elements with identical configurations. This is extremely useful in teaching very small children with learning disabilities or other handicaps to recognize different configurations and realize that certain configurations are identical only if they nest with each other.

Figure 9:
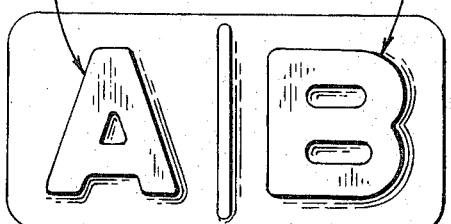
Figure 7:
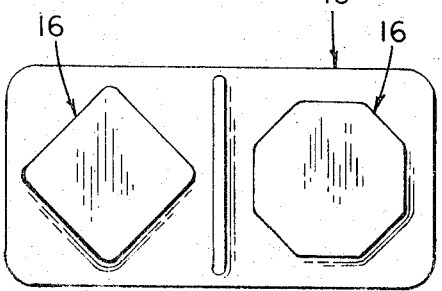
Figure 10:
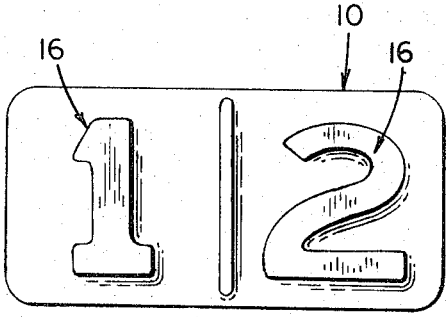

The invention is also extremely useful in teaching children sequential patterns such as number series or the alphabet. As best seen in FIGS. 9 and 10, the end portions of the set numbers are adjacent units of a sequence such as letters A and B in FIG. 9 and numbers 1 and 2 in FIG. 10. The configurations of these members are not symmetrical, so they can only be interlocked when arranged in a straight line to provide the proper order of a particular sequence such as the alphabet.

Thus, it will be understood that the invention provides both a game and a toy which is highly educational in nature and which is extremely useful in teaching recognition of various similar and dissimilar configurations and the relationship of sequential pattern relationships.

The members or pieces of the set can be readily and inexpensively formed from attractive and colorful lightweight material so as to be easy to package and handle.

I claim:

1. In an educational game type toy for teaching the recognition of elementary configurations such as geometric designs, letters, numbers, and the like, a plurality of interlocking members, each comprising:
   a. a relatively thin, flat, oblong base plate having a pair of opposed, integral end sections;
   b. each of said end sections including a hollow, raised element having a particular configuration selected from a set of related configurations having a common theme;
   c. the hollow raised elements of the end sections of each member having configurations different from each other;
   d. the raised elements on the end sections of the members each being contoured so as to nest only with another raised element of identical configuration to provide an overlapping, interlocking fit between matching end sections of related members.

2. An educational game type toy according to claim 1, wherein the configurations of said raised elements are symmetrical, so that matching end sections can be nested when arranged either in a straight line or at right angles to each other to permit the members to be used for a domino type game.

3. An educational game type toy according to claim 1, wherein the configurations of said raised elements are not symmetrical, so that similar end sections can be nested only when arranged in a straight line to insure a sequential arrangement of the members.

4. An educational game type toy according to claim 1, wherein said configurations are geometric designs.

5. An educational game type toy according to claim 1, wherein said configurations are letters of the alphabet.

6. An educational game type toy according to claim 1, wherein said configurations are numbers.

7. An educational game type toy according to claim 1, wherein the configurations on the end sections of each member have a sequential relationship.

8. An educational game type toy according to claim 1, wherein said members each include a separate, hollow, raised, transversely extending reinforcing rib disposed between the end sections thereof on the same side of the said member as said hollow, raised elements.

* * * * *